United States Patent
Price Hoelscher et al.

(10) Patent No.: US 10,626,315 B2
(45) Date of Patent: Apr. 21, 2020

(54) ELECTRICALLY CONDUCTIVE WELLBORE FLUIDS AND METHODS OF USE

(71) Applicant: M-I L.L.C., Houston, TX (US)

(72) Inventors: Brandi Katherine Price Hoelscher, Houston, TX (US); Cara Bovet, Houston, TX (US); James Friedheim, Spring, TX (US); Guido Destefano, Westhill Scotland (GB)

(73) Assignee: M-I L.L.C., Houston, TX (US)

(*) Notice: Subject to any disclaimer, the term of this patent is extended or adjusted under 35 U.S.C. 154(b) by 116 days.

(21) Appl. No.: 14/437,601

(22) PCT Filed: Oct. 22, 2013

(86) PCT No.: PCT/US2013/066026
§ 371 (c)(1),
(2) Date: Apr. 22, 2015

(87) PCT Pub. No.: WO2014/066295
PCT Pub. Date: May 1, 2014

(65) Prior Publication Data
US 2015/0284619 A1 Oct. 8, 2015

Related U.S. Application Data

(60) Provisional application No. 61/716,793, filed on Oct. 22, 2012.

(51) Int. Cl.
| | |
|---|---|
| C09K 8/32 | (2006.01) |
| E21B 7/04 | (2006.01) |
| E21B 49/00 | (2006.01) |
| G01V 3/08 | (2006.01) |
| G01V 3/20 | (2006.01) |
| C09K 8/36 | (2006.01) |
| E21B 47/024 | (2006.01) |
| G01V 15/00 | (2006.01) |

(52) U.S. Cl.
CPC .......... *C09K 8/36* (2013.01); *C09K 8/32* (2013.01); *E21B 7/04* (2013.01); *E21B 47/024* (2013.01); *E21B 49/003* (2013.01); *G01V 3/08* (2013.01); *G01V 15/00* (2013.01); *C09K 2208/10* (2013.01); *G01V 3/20* (2013.01)

(58) Field of Classification Search
CPC ........ C09K 8/32; C09K 8/36; C09K 2208/10; E21B 49/003
USPC ........................................................ 507/140
See application file for complete search history.

(56) References Cited

U.S. PATENT DOCUMENTS

| | | |
|---|---|---|
| 6,239,183 B1 | 5/2001 | Farmer et al. |
| 6,506,710 B1 | 1/2003 | Hoey et al. |
| 6,586,372 B1 | 7/2003 | Bradbury et al. |
| 6,770,603 B1 | 8/2004 | Sawdon et al. |
| 7,060,661 B2 | 6/2006 | Dobson, Sr. et al. |
| 7,176,165 B2 | 2/2007 | Massam et al. |
| 7,303,018 B2 | 12/2007 | Cawiezel et al. |
| 7,510,009 B2 | 3/2009 | Cawiezel et al. |
| 2004/0127366 A1 | 7/2004 | Bradbury et al. |
| 2005/0101493 A1 | 5/2005 | Bradbury et al. |
| 2006/0062715 A1 | 3/2006 | Endo et al. |
| 2006/0188651 A1 | 8/2006 | Bradbury et al. |
| 2008/0064613 A1 | 3/2008 | Massam |
| 2010/0147504 A1 | 6/2010 | King |
| 2010/0300759 A1 | 12/2010 | Passade-Boupat et al. |
| 2011/0003907 A1 | 1/2011 | Choi et al. |
| 2011/0111988 A1 | 5/2011 | Vasii et al. |
| 2011/0254553 A1* | 10/2011 | van Zanten ............ C09K 8/32 324/366 |
| 2012/0015852 A1 | 1/2012 | Quintero et al. |
| 2012/0315541 A1* | 12/2012 | Sasaki ................... H01M 4/131 429/211 |
| 2012/0322694 A1* | 12/2012 | Monteiro ............... C09K 8/032 507/105 |
| 2014/0367091 A1* | 12/2014 | Tour ...................... C09K 8/032 166/250.01 |

FOREIGN PATENT DOCUMENTS

| | | |
|---|---|---|
| CN | 1820096 A | 8/2006 |
| EP | 0902076 A2 | 3/1999 |
| GB | 2345706 A | 7/2000 |
| KR | 10-1464803 B1 | 11/2014 |
| WO | 99/14286 A1 | 3/1999 |
| WO | 2009/089391 A2 | 7/2009 |
| WO | 2011-054111 A1 | 5/2011 |
| WO | 2011/128615 A1 | 10/2011 |

OTHER PUBLICATIONS

Office Action for the equivalent Chinese patent application 201380066907.1 dated Jan. 22, 2017.
EPO Communication with Extended European Search Report dated Jun. 17, 2016, issued by the European Patent Office, Munich, Germany, in related European Patent Application No. 13848615.4 (9 pages).
Crossley, Benjamin L., et al., "Characterizing Multi-Walled Carbon Nanotube Synthesis for Field Emission Applications"; (available from: http://www.intechopen.com/books/carbon-nanotubes-applications-on-electron-devices/characterizing-multi-walled-carbon-nanotube-synthesis-for-field-emission-applications) InTech, Aug. 1, 2011; XP055278918, ISBN: 978-953-30-7496-2; DOI: 10.5772/17782; pp. 105-126.

(Continued)

*Primary Examiner* — Aiqun Li

(57) ABSTRACT

Electrically conductive oil-based wellbore fluids and methods of using same are provided. Wellbore fluids provided may contain one or more carbon nanotubes, where the one or more carbon nanotubes have a particular d/g ratio as determined by Raman spectroscopy. Also provided are methods for electrical logging of a subterranean well that include emplacing a logging medium into a subterranean well, wherein the logging medium contains a non-aqueous fluid and one or more carbon nanotubes, where the one or more carbon nanotubes are present in a concentration so as to permit the electrical logging of the subterranean well; and acquiring an electrical log the subterranean well.

15 Claims, No Drawings

(56) References Cited

OTHER PUBLICATIONS

Hart, John, "Carbon nanotube metrology for science and manufacturing"; (retrieved from the Internet: URL: http://www.nist.gov/cnst/upload/Hart.pdf on Jun. 8, 2016); Jan. 1, 2011; XP055278913; pp. 1-37.
Ghorbani, Nasser, et al., "Using Nanoscale Dispersed Particles to Assist in the Retention of Polyphosphinocarboxylic Acid (PPCA) Scale Inhibitor on Rock" (SPE 156200) SPE International Oilfield Nanotechnology Conference and Exhibition, Jun. 14, 2012; XP055278713, DOI: 10.2118/156200-MS; pp. 1-8.
PCT International Search Report and Written Opinion dated Dec. 24, 2013, issued by the Korean Intellectual Property Office in related International Application No. PCT/US2013/066026 (15 pages).
Office Action for the equivalent Chinese patent application 201380066907.1 dated Oct. 30, 2017.
Office Action for the equivalent Chinese patent application 201380066907.1 dated Jul. 2, 2018.
Communication pursuant to Article 94(3) for the equivalent European patent application 13848615.4 dated Dec. 11, 2018.
Examination Report for the equivalent Malaysian patent application PI2015701292 dated Apr. 30, 2019.
Preliminary Office Action for the equivalent Brazilian patent application BR112015009095-8 dated Sep. 16, 2019.

\* cited by examiner

ELECTRICALLY CONDUCTIVE WELLBORE FLUIDS AND METHODS OF USE

BACKGROUND

Field of the Invention

Embodiments disclosed here generally relate to electrically conductive wellbore fluids. More specifically, embodiments disclosed herein relate to methods for creating or improving conductivity in wellbore fluids.

Background Art

The use of wireline well logs is well known in the art of drilling subterranean wells and in particular oil and gas wells. A wireline log is generated by lowering a logging tool down the well on a wireline. The tool is slowly brought back to the surface and the instruments on the logging tool take measurements that characterize the formations penetrated by the well in addition to other important properties of the well. For example, during logging wireline logs may use measurements of relative resistivity of the formation to determine geological composition of the downhole formation. Also, during drilling, such resistivity measurements may be useful to determine the location of the drill bit to enhance geosteering capabilities and directional drilling control. Thus, electrical logs and other wireline log techniques are depended upon in the oil and gas exploration industry to determine the nature of the geology and the reservoir properties of the petroleum bearing formations penetrated by the well, as well as other properties of the drilling process (e.g., the location of the drill bit). Further, wireline well logs are often the only record of the formations penetrated by the well available for correlation amongst different wells in a particular field.

When an electrical wireline log is made of a well, electrodes on the well logging tool are in contact with wellbore fluid or filter cake and hence the formation rocks through which the well has penetrated. An electrical circuit is created and the resistance and other electrical properties of the circuit may be measured while the logging tool is retracted from the well. The measurement of resistivity requires the presence of a highly conductive path between the logging tool and the formation (i.e., through the wellbore fluid). The resulting data is a measure of the electrical properties of the drilled formations verses the depth of the well. The results of such measurements may be interpreted to determine the presence or absence of petroleum or gas, the porosity of the formation rock, and other important properties of the well.

An alternative or supplement to wireline logging involves logging tools placed in specialized drill collar housing and run in the drill string near the bit. This technique is known as logging-while-drilling (LWD) or formation-evaluation-while-drilling (FEWD). Measurements such as electrical resistivity may be thereby taken and stored down hole for later retrieval during a "tripping out" of the drill string, or transmitted to the surface via mud-pulse telemetry. Such techniques are known to one of skill in the art of well drilling and subterranean well logging.

The use of oil-based muds and wellbore fluids has become increasingly popular since their introduction of the technology in the 1950's. Innovations in oil-based muds and wellbore fluids are of on-going importance with the development of environmentally friendly wellbore fluids and fluids having other special characteristics. Oil-based muds offer advantages over water-based muds in many drilling situations. In particular, oil-based muds are known in the art to provide excellent shale inhibition, borehole stability, lubricity, thermal stability, tolerance of contamination, and ease of maintenance. However, oil-based muds and wellbore fluids also have some disadvantages. One disadvantage is that normal resistivity and self potential measurements cannot be taken when the well has been drilled with a conventional oil-based mud or wellbore fluid due to the non-conductive nature of the oil-based wellbore fluids and muds.

Oil-based wellbore fluids, which may also be present as invert emulsion fluids, are water-in-oil emulsions in which oil is the continuous or external phase, and water is the internal phase. Invert emulsion fluids are often used because they provide superior drilling and wellbore stability performance. One disadvantage of oil-based wellbore fluids is that they are non-conductive in nature. Said another way, when invert emulsion fluids are used, any electrical path through the fluid is insulating due to the non-conductive nature of the external oil phase. This severely limits the amount and clarity of resistivity information that may be gathered from a wellbore using wireline logging.

SUMMARY

In one aspect, the embodiments disclosed herein relate to oil-based wellbore fluids that allow the taking of resistivity measurements of the well, such as wireline logging. In another aspect, embodiments disclosed herein relate to electrically conductive oil-based wellbore fluids including: an oil-based fluid; one or more carbon nanotubes, wherein the one or more carbon nanotubes have a d/g ratio as determined by Raman spectroscopy of 0.01 to 0.6.

In yet another aspect, embodiments disclosed herein relate to electrically conductive oil-based wellbore fluids containing: an oil-based fluid; one or more carbon nanotubes, and one or more emulsifiers selected from a group consisting of carboxylic acid-based emulsifiers, carboxylic fatty acids, dimer acids, and dimers of fatty acids.

In another aspect, embodiments disclosed herein relate to methods for electrical logging of a subterranean well including: placing into the subterranean well a logging medium, wherein the logging medium contains a non-aqueous fluid and one or more carbon nanotubes, wherein the one or more carbon nanomaterials have a d/g ratio as determined by Raman spectroscopy of 0.01 to 0.6, and wherein the one or more carbon nanotubes are present in a concentration so as to permit the electrical logging of the subterranean well; and acquiring an electrical log the subterranean well.

In still another aspect, embodiments disclosed herein relate to methods for electrical logging of subsection of a subterranean well including: emplacing a non-aqueous drilling fluid into a wellbore; identifying a subsection of the wellbore for imaging; introducing to the subsection of the wellbore a non-aqueous fluid comprising one or more carbon nanotubes; and acquiring an electrical log of the subsection of the wellbore.

This summary is provided to introduce a selection of concepts that are further described below in the detailed description. This summary is not intended to identify key or essential features of the claimed subject matter, nor is it intended to be used as an aid in limiting the scope of the claimed subject matter.

DETAILED DESCRIPTION

In some aspects, embodiments disclosed herein relate to electrically conductive wellbore fluids. More specifically, embodiments disclosed herein relate to wellbore fluids containing one or more carbon nanomaterials. In some embodiments, wellbore fluids disclosed herein may be an oil-based wellbore fluid, while in other embodiments the wellbore fluid may be an invert emulsion or a high internal phase ratio (HIPR) emulsion containing an aqueous discontinuous phase and an oil-based continuous phase.

In other aspects, embodiments disclosed herein relate to methods for creating or improving conductivity in wellbore fluids. Certain embodiments disclosed herein also relate to methods for electrical logging of a subterranean well including placing into the subterranean well a logging medium, where the logging medium comprises a non-aqueous fluid and one or more graphene-based carbon nanomaterials, where the carbon nanomaterials are present in a concentration so as to permit the electrical logging of the subterranean well. More specifically, embodiments disclosed herein relate to wellbore fluids containing additives, and methods for obtaining such wellbore fluids, whereby the additives increase the conductivity of the fluid, thereby allowing for electrical logging of the subterranean well.

In the present disclosure, certain details are set forth such as specific quantities, concentrations, sizes, etc. so as to provide a thorough understanding of the various embodiments disclosed herein. However, it will be apparent to those skilled in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

While most of the terms used herein will be recognizable to those of skill in the art, the following definitions are nevertheless put forth to aid in the understanding of the present disclosure. It should be understood, however, that when not explicitly defined, terms should be interpreted as adopting a meaning presently accepted by those of skill in the art.

The oil-based wellbore fluids of the present disclosure may include fluids that are substantially comprised of an oleaginous liquid, as well as emulsions of oleaginous and non-oleaginous fluids. In particular, various embodiments of the present disclosure may provide for an invert emulsion wellbore fluid. "Invert emulsion," as used herein, is an emulsion in which a non-oleaginous fluid is the discontinuous phase and an oleaginous fluid is the continuous phase.

"Oleaginous liquid," as used herein, means an oil which is a liquid at 25° C. and is immiscible with water. Oleaginous liquids may include substances such as hydrocarbons used in the formulation of drilling fluids such as diesel oil, mineral oil, synthetic oil (including linear alpha olefins and internal olefins), ester oils, glycerides of fatty acids, aliphatic esters, aliphatic ethers, aliphatic acetals, or other such hydrocarbons and combinations of these fluids.

"Non-oleaginous liquid," as used herein, means any substance that is a liquid at 25° C. and that is not an oleaginous liquid as defined above. Non-oleaginous liquids are immiscible with oleaginous liquids but capable of forming emulsions therewith. Non-oleaginous liquids may include aqueous substances such as fresh water, sea water, brine containing inorganic or organic dissolved salts, aqueous solutions containing water-miscible organic compounds and mixtures of these.

As used herein, the term "carbon nanomaterial" is used to refer to graphitic-based materials composed essentially of carbon including, but not limited to, single-walled carbon nanotubes, multi-walled nanotubes, buckminsterfullerenes, buckypaper, carbon nanofibers, nanoplatelets, nano-onions, nanohorns, and the like. "Graphitic," as used herein, refers to structures and materials containing aromatic carbon lattices or networks such as, for example, those present in graphene and graphite.

A "carbon nanotube," as defined herein, refers to high aspect ratio aromatic graphene cylinders composed of polycyclic carbon. Unless specifically denoted single- or multi-walled, descriptions with regard to carbon nanotubes within the specification are applicable to both single- and multi-walled nanotubes.

"Particulate carbon," as used herein, refers to crystalline, semi-crystalline, or amorphous spherical and pseudo-spherical particles composed predominantly of carbon such as graphite, synthetic graphite, carbon black, conductive carbon black, thermal black, furnace black, and the like.

The term "alkyl" as used herein, unless otherwise specified, refers to a saturated straight chain, branched or cyclic hydrocarbon group of 1 to 24, or 1-12 in particular embodiments, carbon atoms, such as methyl, ethyl, n-propyl, isopropyl, n-butyl, isobutyl, t-butyl, pentyl, cyclopentyl, isopentyl, neopentyl, hexyl, isohexyl, cyclohexyl, 3-methylpentyl, 2,2-dimethylbutyl, and 2,3-dimethylbutyl. The term "lower alkyl" intends an alkyl group of one to six carbon atoms, and includes, for example, methyl, ethyl, n-propyl, isopropyl, n-butyl, isobutyl, t-butyl, pentyl, cyclopentyl, isopentyl, neopentyl, hexyl, isohexyl, cyclohexyl, 3-methylpentyl, 2,2-dimethylbutyl, and 2,3-dimethylbutyl. The term "cycloalkyl" refers to cyclic alkyl groups such as cyclopropyl, cyclobutyl, cyclopentyl, cyclohexyl, cycloheptyl and cyclooctyl.

Moreover, the term "alkyl" includes "modified alkyl", which references an alkyl group having from one to twenty-four carbon atoms, and further having additional groups, such as one or more linkages selected from ether-, thio-, amino-, phospho-, oxo-, ester-, and amido-, and/or being substituted with one or more additional groups including lower alkyl, aryl, alkoxy, thioalkyl, hydroxyl, amino, sulfonyl, thio, mercapto, imino, halo, cyano, nitro, nitroso, azide, carboxy, sulfide, sulfone, sulfoxy, phosphoryl, silyl, silyloxy, and boronyl. Similarly, the term "lower alkyl" includes "modified lower alkyl", which references a group having from one to eight carbon atoms and further having additional groups, such as one or more linkages selected from ether-, thio-, amino-, phospho-, keto-, ester-, and amido-, and/or being substituted with one or more groups including lower alkyl; aryl, alkoxy, thioalkyl, hydroxyl, amino, sulfonyl, thio, mercapto, imino, halo, cyano, nitro, nitroso, azide, carboxy, sulfide, sulfone, sulfoxy, phosphoryl, silyl, silyloxy, and boronyl. The term "alkoxy" as used herein refers to a substituent —O—R wherein R is alkyl as defined above. The term "lower alkoxy" refers to such a group wherein R is lower alkyl. The term "thioalkyl" as used herein refers to a substituent —S—R wherein R is alkyl as defined above.

The term "alkenyl" as used herein, unless otherwise specified, refers to a branched, unbranched or cyclic (e.g. in the case of C5 and C6) hydrocarbon group of 2 to 30, or 2 to 12 in some embodiments, carbon atoms containing at least one double bond, such as ethenyl, vinyl, allyl, octenyl, decenyl, dodecenyl, and the like. The term "lower alkenyl" intends an alkenyl group of two to eight carbon atoms, and specifically includes vinyl and allyl. The term "cycloalkenyl" refers to cyclic alkenyl groups.

The term "alkynyl" as used herein, unless otherwise specified, refers to a branched or unbranched hydrocarbon group of 2 to 24, or 2 to 12 in some embodiments, carbon atoms containing at least one triple bond, such as acetylenyl, ethynyl, n-propynyl, isopropynyl, n-butynyl, isobutynyl, t-butynyl, octynyl, decynyl and the like. The term "lower alkynyl" intends an alkynyl group of two to eight carbon atoms, and includes, for example, acetylenyl and propynyl, and the term "cycloalkynyl" refers to cyclic alkynyl groups.

In the process of rotary drilling a well, a wellbore fluid or mud is circulated down the rotating drill pipe, through the bit, and up the annular space between the pipe and the formation or steel casing, to the surface. The wellbore fluid performs different functions. It removes cuttings from the bottom of the hole to the surface, suspends cuttings and weighting material when the circulation is interrupted, controls subsurface pressure, isolates the fluids from the formation by providing sufficient hydrostatic pressure to prevent the ingress of formation fluids into the wellbore, cools and lubricates the drill string and bit, maximizes penetration rate etc. An important objective in drilling a well is also to secure the maximum amount of information about the type of formations being penetrated and the type of fluids or gases in the formation. This information is obtained by analyzing the cuttings and by electrical logging technology and by the use of various downhole logging techniques, including electrical measurements.

Wellbore fluids may be classified according to the primary component of the continuous phase, which are predominantly one of aqueous (water-based) wellbore fluids and non-aqueous (oleaginous or oil-based) wellbore fluids. Although oil-based wellbore fluids are more expensive than water-based muds, they are more often used for drilling operations because of their operational advantage and superior technical performance when compared with water-based muds.

In spite of the general preference for oil-based wellbore fluids, these wellbore fluids have a technical disadvantage for electrical well-logging because of their very low electrical conductivity. Various logging and imaging operations are performed during the drilling operation, for example while drilling in the reservoir region of an oil/gas well in order to determine the type of formation and the material therein. Such information may be used to optimally locate the pay zone, i.e., where the reservoir is perforated in order to allow the inflow of hydrocarbons to the wellbore.

Some logging tools work on the basis of a resistivity contrast between the fluid in the wellbore (wellbore fluid) and that already in the formation. These are known as resistivity logging tools. Briefly, alternating current flows through the formation between two electrodes. Thus, the fluids in the path of the electric current are the formation fluids and the fluid that has penetrated the formation by way of filtration. The filtercake and filtrate result from filtration of the mud over a permeable medium (such as formation rock) under differential pressure.

Another example where fluid conductivity plays a part in the drilling operation is in directional drilling where signals produced at the drill assembly have to be transmitted through an electrically conductive medium to the control unit and/or mud telemetry unit further back on the drill string. In some instances, such resistivity measurements may be useful in geosteering and directional drilling control.

The use of resistivity logging tools is often limited to cases where a water-based wellbore fluid is used for the drilling operations because the low conductivity of the base-oil in the case of oil/synthetic-base wellbore fluids precludes the use of resistivity tools in such fluids. The case is similarly true for invert emulsion wellbore fluids. Invert emulsion wellbore fluids are water-in-oil emulsions in which oil is the continuous or external phase, and water is the internal phase. Thus, when invert emulsion fluids are used, any electrical path through the fluid is insulated due to the non-conductive nature of the external oil phase. In other words, even though the brine dispersed in the oil phase is electrically conductive, the discontinuous nature of the droplets prevents the flow of electricity. Indeed, the inability of these emulsions to conduct electricity (until a very high potential difference is applied) is used as a standard test of emulsion stability. The non-conductive nature of invert emulsion wellbore fluids severely limits the amount and clarity of resistivity information that may be gathered from a wellbore using wireline logging.

Thus, embodiments of methods disclosed herein include methods of logging a subterranean well and wellbore fluids useful in such methods. In some embodiments, the methods may include placing into the subterranean well wellbore fluids, including non-aqueous fluids such as invert emulsions. The wellbore fluids may include one or more graphene-based carbon nanomaterials of the present disclosure present in a concentration so as to permit or improve the electrical logging of the well by the increased electrical conductance of the wellbore fluid. In some embodiments, the one or more carbon nanomaterials may be added to the wellbore fluids after the wellbore fluids have been placed into the subterranean well. Other embodiments include the drilling of a subterranean well with an oleaginous-based wellbore fluid described herein. In such embodiments, the oleaginous-based wellbore fluids of the present disclosure may be formulated so as to enable one to take electrical log measurements of the subterranean well, despite the naturally low conductivity of the fluid.

In some embodiments, during logging and while using wellbore fluids and carbon nanomaterials as described herein, wireline logs may be used to take measurements of relative resistivity of the formation. The measurements of relative resistivity of the formation may be used to determine geological composition of the downhole formation. Also, such resistivity measurements may be useful to determine the location of the drill bit to enhance geosteering capabilities and directional drilling control. In some embodiments, the wellbore fluids and carbon nanomaterials disclosed herein may be used with drilling systems having a measurement-while-drilling ("MWD") system. For example, drilling and formation data and parameters may be determined from various downhole measuring devices and may be transformed downhole into selected parameters of interest and then transferred by telemetry to the surface.

In other embodiments, the measurements may be stored downhole for subsequent retrieval, or they may be both transferred via telemetry to the surface and/or stored downhole. In some embodiments, measurements may be depth-correlated, using depth measurements made downhole for improving accuracy of the measurements and the parameters of interest. In additional embodiments, the measurements and/or parameters may be correlated with stored reference data for providing additional information pertaining to the drilling operations and the formation characteristics. Thus, the logging measurements may be used to determine the drill bit location relative to the desired drilling path and to adjust the drilling activity downhole. Thus, these electrical logs and other wireline log techniques may determine the nature of the geology and the reservoir properties of the petroleum bearing formations penetrated by the well, as well as other properties of the drilling process (e.g., the location of the drill bit).

Carbon Nanomaterials

Embodiments of the present disclosure may incorporate one or more carbon nanomaterials in such an amount that the wellbore fluid is electrically conductive and useful any application where conductive wellbore fluids have previously been employed, including, for example, wellbore logging and geosteering applications. The carbon nanomaterials described herein may be added to any wellbore fluid, or a custom wellbore fluid formulation may be prepared.

Carbon nanomaterials in accordance with embodiments of the present disclosure are formed from the carbon allotrope graphene, a planar array of $sp^2$ bonded carbon atoms that form an interconnected "honeycomb" network of five-, six- and seven-membered rings. In one or more embodiments, carbon nanomaterials useful in increasing the conductivity of wellbore fluids described herein may include single- and multi-walled carbon nanotubes. Carbon nanotubes are high aspect ratio graphene cylinders, where the aspect ratio may range from 1,000,000,000 to 1 in some embodiments, and 1,000,000 to 1 in other embodiments. However, as synthesis techniques for generating carbon nanotubes advance and higher aspect ratios become available, it is also envisioned that higher aspect ratio nanotubes may be incorporated into wellbore fluids without deviating from the scope of the present disclosure.

Carbon nanotubes may be classified generally as single- and multi-walled. Single-walled nanotubes (SWNT) are composed of a single cylinder of fused carbon rings where the diameter may vary from 0.7 to 2 nm, while the length (longest dimensional measurement) may range from 50 nm to several centimeters. Multiwall nanotubes (MWNTs) are composed of several concentric graphene layers, where diameter may vary from 10 to 200 nm with lengths from several nanometers to several centimeters. While a number of size ranges have been included for illustrative purposes, this size ranges are not meant to limit the disclosure. In other embodiments, carbon nanomaterials may include buckminsterfullerene, buckypaper, nanofiber, nanoplatelets, nanoonions, nanohorns, and derivatives thereof.

In one or more embodiments of the present disclosure, carbon nanomaterials may possess a length having a lower limit equal to or greater than 1 μm, 10 μm, 50 μm, 100 μm, 500 μm, 800 μm, 1 mm, 10 mm, 5 cm, 8 cm, 10 cm, and 15 cm, to an upper limit of 10 μm, 50 μm, 100 μm, 500 μm, 800 μm, 1 mm, 10 mm, 5 cm, 8 cm, 10 cm, 15 cm, 20 cm, and 25 cm, where the length of the carbon nanomaterials may range from any lower limit to any upper limit.

Raman spectroscopy is a powerful characterization technique for analyzing carbon-based materials that include diamond, graphite, diamond-like carbon, amorphous carbon, two-dimensional graphene, one-dimensional carbon structures such as single-walled nanotubes (SWNT) or multi-walled nanotubes (MWNT), and zero-dimensional carbon structures such as fullerenes. Carbon-based materials may, in many cases, have three intense Raman features at ~1580 $cm^1$ (g band), ~1350 $cm^1$ (d band), and ~2700 $cm^{-1}$ (2d band). The application of Raman spectroscopy of carbon nanomaterials such as carbon nanotubes, which may be applied to all carbon-based materials described within the present disclosure, is discussed in greater detail in "Raman spectroscopy of carbon nanotubes," Drusselhaus, M. S. et al., Physics Reports, Volume 409, Issue 2, March 2005, Pages 47-99.

The relative intensity of the g band frequency of Raman spectra may be used as a measure for a number of features that provide information regarding sample purity, geometry, and the metallic or semi-conducting nature of the material. In the case of carbon nanotubes, the g band frequency may also be used to distinguish between single- or multi-walled nanotubes. Another prominent feature in the Raman spectra of carbon-based materials is the d band. The d band is sensitive to differences in the carbon network that is characteristic of many carbon-based materials, and the intensity of the d band may provide information on the electronic character of a particular material. Because a carbon lattice may contain aromatic carbons that are $sp^2$ hybridized and may be substantially more conductive, it may be beneficial to select for carbon nanomaterials having fewer numbers of non-aromatic $sp^3$ hybridized carbon sites, or "defects" in the carbon lattice. For example, higher intensity in the d band in a Raman spectrum may indicate that a particular sample has a higher concentration of defects and may not be as conductive as a sample having a relatively lower d band intensity.

The ratio of the d band to the g band (d/g ratio) may also be used as a measure of both the purity of a sample and, in relatively pure samples, can be used to characterize the defects present on single- or multi-wall nanotubes, where a lower d/g ratio may indicate the a sample containing higher general concentrations of $sp^2$ carbons, a more complete carbon lattice on the surface of the materials, and higher general electrical and/or thermal conductivity.

In one or more embodiments the carbon nanomaterials may have a d/g ratio having a lower limit equal to or greater than 0.01, 0.1, 0.2, and 0.3, to an upper limit of 0.15, 0.2, 0.3, 0.4, 0.5, 0.6, 0.8, and 1, where the d/g ratio of the carbon nanomaterials may range from any lower limit to any upper limit. In other embodiments, the d/g ratio as measured by Raman spectroscopy may be less than 0.6. In yet other embodiments, the d/g ratio as measured by Raman spectroscopy may be less than 0.25.

In embodiments, the addition of functional groups to carbon nanomaterials (also referred to herein as covalent modification, modification, or functionalization) may generally improve the dispersibility of the carbon nanomaterials in oleaginous liquids or other various solvent systems such as aqueous fluids or the aqueous phase of an emulsion or invert emulsion. In some embodiments, the carbon nanomaterial may include, for example, carbon nanomaterials functionalized with at least one of alkyl groups, hydroxyalkyl groups, amino alkyl, haloalkyl, mercapto alkyl, alkenyl, alkynyl, carboxyl groups, amines, quaternary amines, nitro groups, nitrate esters, ethoxylated ethers, propoxylated ether, glycol derived groups, polyacrylamide, polyacrylic acid, polymethyl methacrylate polyglycol, polyvinyl alcohol, silanes, silane oxides, sulfonates, sulfonate esters, benzenesulfonate, nitriles, and combinations thereof.

In embodiments, carbon nanomaterials disclosed herein may be functionalized using a number of reactions well known in the art, including reductive alkylation, dichlorocarbene addition, Birch reduction, Bingel reaction, radical addition, ozonolysis, diazonium salt chemistry, and the like. The mechanism(s) of functionalization will depend on the exact nature of the introduced molecules and may include, for example, esterification, etherification, nucleophilic addition including nucleophilic ring opening of epoxides, radical nucleophilic substitution and addition, electrophilic addition, radical addition, dipolar addition, Diels-Alder addition and other similar additions with cyclic intermediates, etc. In some embodiments, following a first functionalization step, covalently modified carbon nanomaterials agents may be further modified to include additional functional groups, or reacted to attach other small molecules, oligomers, or polymers.

Functionalization of carbon nanomaterials may include the covalent attachment of small molecules, oligomers, or polymers to modify solubility or charge of the carbon nanomaterial. In some embodiments of the present disclosure, oligomers and polymers may be selected from, for example, polyacetylene, polyfluorenes, polyphenylene, polypyrene, polyazulenes, polynaphthalenes, polypyrrole, polycarbazole, polyindole, polyazepine, polythiopene, poly p-phenyl sulfide, poly(p-phenylene vinylene), and other conductive polymers known to those skilled in the art. In other embodiments, carbon nanomaterials may be functionalized to enhance water solubility through covalent modification of the materials with to include, for example, hydroxyl groups, polyalcohols, carbohydrates, oligomeric ethylene oxide, poly(ethylene oxide), oligomeric propylene oxide, polypropylene oxide, and acrylates.

It is also envisioned that combinations of one or more small molecules, oligomers, and polymers may be attached to carbon nanomaterials of the present disclosure, in order to tune properties such as solubility, surface charge, and conductivity depending on the demands of a particular downhole environment.

Dispersion of carbon nanomaterials may be accomplished by a number of methods including, for example, stirring, sonicating, or combinations thereof. In various embodiments, the methods include suspending the carbon nanomaterials in a surfactant to facilitate the dispersing step, such as a surfactant already being used in the fluid.

Carbon nanomaterials within wellbore fluids are thermally stable at temperatures ranging as high as 325° C. or above. In some embodiments, carbon nanomaterials may be incorporated into wellbore fluids at a percent by weight (wt %) of 5 wt % or less. In yet another embodiment, carbon nanomaterials may be incorporated into wellbore fluids up to about 12% without introducing excessive viscosity that may render the wellbore fluid unsuitable for pumping through a drill string.

In one or more embodiments, carbon nanomaterials materials may included in a wellbore fluid at a percent by weight concentration ranging from about 0.0001 wt % to about 10 wt %. In other embodiments, carbon nanomaterials may be incorporated at 3 wt % or less or at 1 wt % or less. In some embodiments, when two or more carbon nanomaterials are mixed in a wellbore fluid, sufficient electrical conductivity may be obtained at concentrations lower than relative concentrations of the individual nanomaterials added alone.

In order to increase the solubility of carbon nanomaterials and/or particulate carbons in various solvents and to reduce aggregate formation, chemical dispersants or covalent modification of the surfaces of the carbon nanomaterials and/or particulate carbons with functional groups may be used to increase their oil or water solubility and/or create stable dispersions in a wellbore fluid.

Dispersants effective for increasing the stability of the carbon nanomaterials and/or particulate carbons in aqueous fluids or the aqueous phases of an emulsion included polyethylene glycol p-(1,1,3,3-tetramethylbutyl)-phenyl ether, sodium dodecyl benzene sulfonate, sodium dodecyl sulfate, dodecyl trimethyl ammonium bromide, cetyl trimethyl ammonium bromide, sodium alkyl sulfosuccinate, polystyrene sulfonate, sodium n-lauroylsarcosinate, polyvinyl pyrrolidone, poloxamers such as Pluronic™, polyethylene oxide/polybutylene oxide triblock copolymers, polysorbate detergents such as polyoxyethylene sorbitan monolaurate, polyoxyethylene sorbitan monooleate, and the like.

Effective dispersants of carbon nanomaterials and/or particulate carbons within oil-based or oleaginous fluids include polyisobutene succinimide, polythiophene and copolymers of thiophene and 3-hexylthiophene, as described in U.S. Pat. Pub. No. 2011/0003907, which are incorporated herein by reference. In other embodiments, alkylated polyvinyl pyrrolidone polymer dispersants may be used such as the Ganex® series of dispersants available from Ashland (Wayne, N.J.).

In some embodiments, one or more dispersants may be added to the wellbore fluid at a concentration in the range of 0.05 wt % to 1 wt %. In other embodiments, dispersants may be added to the wellbore fluid at a concentration in the range of 0.1 wt % to 0.8 wt %. In yet more embodiments, the dispersant concentration added to the wellbore may fall within the range of 0.3 wt % to 0.7 wt %.

Particulate Carbon

In some embodiments, it may be beneficial to add a particulate carbon in addition to the carbon nanomaterials outlined above. In contrast to the carbon nanomaterials, particulate carbon reagents may be predominantly spherical, having an overall particle diameter that is more or less uniform. Wellbore fluids in accordance with some embodiments of the instant disclosure may include a particulate carbon having an average particle diameter that is less than that of the carbon nanomaterials described above.

Types of carbon black that may be added to wellbore fluids in accordance with embodiments disclosed herein may be in the form of fine powders composed essentially of elemental carbon that possess a large surface area. On a molecular level, carbon black may be composed of amorphous graphitic layers formed from a continuous planar arrangement of aromatic rings. Types of carbon black may include ivory black, vine black, furnace black, thermal black, conductive carbon black, acetylene black, and the like.

Depending on the method of manufacture, the physical and chemical properties of carbon black can vary significantly. Some forms of carbon black, including conductive carbon black and thermal black, are formed over a longer time scales and at higher temperature than, for example, furnace black, which may result in a carbon black particles that are highly ordered and predominantly spherical. Because of the ordered structure, conductive carbon black and thermal black may have large numbers of aromatic carbons on the surface of the constituent particles, which may be useful in increasing electrical conductivity of wellbore fluids that contain such types of carbon black. In one or more embodiments, the particulate carbon may also be or include synthetic graphite, where synthetic graphite is a manufactured product made by high-temperature treatment of amorphous carbon materials that include, for example, calcined petroleum coke and coal tar pitch.

In one or more embodiments, particulate carbon may have an average particle size ($D_{50}$) with a lower limit equal to or greater than 0.25 μm, 0.5 μm, 1 μm, 2 μm, 5 μm, 6 μm, and 8 μm to an upper limit of 10 μm, 15 μm, 20 μm, 40 μm, and 50 μm, where the $D_{50}$ of the particulate carbon may range from any lower limit to any upper limit.

Wellbore fluids according to embodiments herein may include a mixture of carbon nanomaterials and particulate carbons that synergistically interact to increase percolation and electrical conductivity of the surrounding fluid. While not being bound to a particular theory, it is postulated that the carbon black may fill in the interstitial spaces between neighboring carbon nanotubes, increasing the electron transfer and, in turn, increasing percolation and conductivity throughout the wellbore fluid.

In a particular embodiment, carbon nanomaterial and particulate carbon may be added to a wellbore fluid at a weight/weight (wt/wt) ratio of carbon nanomaterial to particulate carbon having a lower limit equal to or greater than 0.01, 0.1, 0.2, and 0.3, to an upper limit of 0.5, 1, 1.5, 2, 5, 10, 20, and 30, where the wt/wt ratio of carbon nanomaterial to particulate carbon may range from any lower limit to any upper limit.

Wellbore Fluids

Wellbore fluids described herein may be oil-based wellbore fluids or invert emulsions in one or more embodiments. Suitable oil-based or oleaginous fluids may be a natural or synthetic oil and in some embodiments, in some embodiments the oleaginous fluid may be selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof.

In other embodiments, the wellbore fluid may be an invert emulsion having a continuous oleaginous phase and a discontinuous aqueous (or non-oleaginous liquid) phase, among other substances and additives. Non-oleaginous liquids may, in some embodiments, include at least one of fresh water, sea water, brine, mixtures of water and water-soluble organic compounds, and mixtures thereof. In various embodiments, the non-oleaginous fluid may be a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

The amount of oleaginous liquid in the invert emulsion fluid may vary depending upon the particular oleaginous fluid used, the particular non-oleaginous fluid used, and the particular application in which the invert emulsion fluid is to be employed. However, in some embodiments, the amount of oleaginous liquid may be sufficient to form a stable emulsion when used as the continuous phase. In some embodiments, the amount of oleaginous liquid may be at least about 30, or at least about 40, or at least about 50 percent by volume of the total fluid. The amount of non-oleaginous liquid in the invert emulsion fluid may vary depending upon the particular non-oleaginous fluid used and the particular application in which the invert emulsion fluid is to be employed. In some embodiments, the amount of non-oleaginous liquid may be at least about 1, or at least about 3, or at least about 5 percent by volume of the total fluid. In some embodiments, the amount may not be so great that it cannot be dispersed in the oleaginous phase. Therefore, in certain embodiments, the amount of non-oleaginous liquid may be less than about 90, or less than about 80, or less than about 70 percent by volume of the total fluid.

The invert emulsion fluid may also possess a stable internal non-oleaginous phase within the external oleaginous phase. Specifically, upon application of an electric field to an invert emulsion fluid, the emulsified non-oleaginous phase, which possesses charge, will migrate to one of the electrodes used to generate the electric field. The incorporation of emulsifiers in the invert emulsion fluid stabilizes the emulsion and results in a slowing of the migration rate and/or increased voltage for breakage of the emulsion. Thus, an electrical stability (ES) test, specified by the American Petroleum Institute at API Recommended Practice 13B-2, Third Edition (February 1998), is often used to determine the stability of the emulsion. ES is determined by applying a voltage-ramped, sinusoidal electrical signal across a probe (consisting of a pair of parallel flat-plate electrodes) immersed in the mud. The resulting current remains low until a threshold voltage is reached, whereupon the current rises very rapidly. This threshold voltage is referred to as the ES ("the API ES") of the mud and is defined as the voltage in peak volts-measured when the current reaches 61 $\mu$A. The test is performed by inserting the ES probe into a cup of 120° F. [48.9° C.] mud applying an increasing voltage (from 0 to 2000 volts) across an electrode gap in the probe. The higher the ES voltage measured for the fluid, the stronger or harder to break would be the emulsion created with the fluid, and the more stable the emulsion is.

Further, in some embodiments the present disclosure relates to fluids having a high internal phase ratio wherein the emulsion droplet size is smaller as compared to conventional emulsion droplets. For example, the non-oleaginous phase distributed in the oleaginous phase may have an average diameter in the range of 0.5 to 5 microns in one embodiment, and in the range of 1 to 3 microns in a more particular embodiment. The droplet size distribution may be such that at least 90% of the diameters are within 20% or especially 10% of the average diameter. In other embodiments, there may be a multimodal distribution. This droplet size may be approximately one-third to one-fourth the size of emulsion droplets formed using conventional emulsifiers. In a particular embodiment, the emulsion droplets may be smaller than the solid weighting agents used in the fluids.

Wellbore Fluid Additives

The wellbore fluids of the present disclosure may further contain additives so long as the additives do not interfere with the properties of the compositions described herein. For example, emulsifiers, wetting agents, organophilic clays, viscosifiers, weighting agents, bridging agents, fluid loss control agents, and corrosion inhibitors may be added to the compositions disclosed herein so as to impart additional functional properties.

Wetting agents and emulsifiers that may be suitable for use include, but are not limited to, crude tall oil, oxidized crude tall oil, surfactants, organic phosphate esters, modified imidazolines and amidoamines, alkyl aromatic sulfates and sulfonates, and the like, and combinations or derivatives of these. VERSAWET™ and VERSACOAT™, NOVAMUL™, FAZEMUL™, FAZEWET™, MEGAMUL™, SUREMUL™, ONEMUL™, and MUL-XT™ are non-limiting examples of commercially available emulsifiers manufactured and distributed by M-I, L.L.C. that may be used in the fluids and methods of this disclosure. Other suitable surfactants that are commercially available include SILWET™ series of emulsifiers such as L-77, L-7001, L7605 and L-7622, which are distributed by Union Carbide Chemical Company Inc. In one or more embodiments of the present disclosure, the emulsifier may be selected from amidoamine surfactants such as those described in U.S. Pat. Nos. 6,239,183; 6,506,710; 7,060,661; 7,303,018; and 7,510,009.

In other embodiments, the emulsifier may be carboxylic acid-based emulsifier such as, for example, an emulsifier selected from dicarboxylic fatty acids, dimer acids, or dimers of fatty acids. Dicarboxylic fatty acids have the general formula HOOC—R—COOH, wherein R is an alkyl or alkenyl group containing from 10 to 50 carbon atoms, and in particular embodiments from 20 to 40 carbon atoms. In other embodiments, emulsifiers may be selected from the dimerization products of unsaturated dicarboxylic fatty acids, for example, such as products prepared by dimerization of unsaturated fatty acids containing from 8 to about 18 carbon atoms, including 9-dodecenoic(cis), 9-tetradecenoic (cis), 9-octadecenoic(cis), octadecatetranoic acids and the like.

Organophilic clays, normally amine treated clays, may be useful as viscosifiers in the fluid compositions disclosed herein. Other viscosifiers and gellants, such as oil soluble polymers, polyamide resins, polycarboxylic acids and soaps may also be used. Attapulgite clay and sepiolite clay may also be used as viscosifiers. The amount of viscosifier used in the compositions may vary depending on downhole conditions, as understood by those skilled in the art. However, normally about 0.1% to 6% by weight range may be sufficient for most applications. VG-69™ and VG-PLUS™ are organoclay available from MI SWACO (Houston, Tex.), and VERSA-HRP™ is a polyamide resin material available from MI SWACO (Houston, Tex.) that may be used in the fluids and methods of this disclosure.

Fluid loss control agents may act by coating the walls of the well. Suitable fluid loss control agents may include, but are not limited to, modified lignites, asphaltic compounds, gilsonite, organophilic humates or tannins prepared by reacting humic acid or tannic acid with amides or polyalkylene polyamines, amine-treated tannins such as ONE-TROL™, and latex polymers. In embodiments, the fluid loss control agent may be selected from one or more of VERSATROL™, VERSATROL™, VERSALIG™, ECOTROL™ RD, ONE-TROL™, EMI 789, and NOVATECH™ F, which are all commercially available from MI SWACO (Houston, Tex.).

Corrosion inhibitors may also be added to the drilling fluids disclosed herein to control the corrosion of the drilling equipment. Depending upon the type of corrosion encountered, the corrosion inhibitor may be organic or inorganic or some combination thereof. Non-limiting examples of corrosion inhibitors include phosphates, silicates, borates, zinc compounds, organic amines, benzoic acid, and benzoic acid derivatives, phosphate esters, heterocyclic nitrogen and sulfur compounds, organic acids, and the like. Non-limiting examples of commercially available corrosion inhibitors include sodium benzoate and benzotriazole.

Weighting agents or density materials suitable for use in wellbore fluid formulations in accordance with the present disclosure include, but are not limited to, hematite, magnetite, iron oxides, illmenite, barite, siderite, celestite, dolomite, calcite, manganese oxides, halites and the like. In other embodiments, the micronized weighting agents may be coated with a dispersant.

For example, fluids used in some embodiments disclosed herein may include dispersant coated micronized weighting agents. The coated weighting agents may be formed by either a dry coating process or a wet coating process. Weighting agents suitable for use in other embodiments disclosed herein may include those disclosed in U.S. Patent Application Publication Nos. 2004/0127366, 2005/0101493, 2006/0188651, U.S. Pat. Nos. 6,586,372 and 7,176,165, and U.S. Provisional Application Ser. No. 60/825,156, each of which is hereby incorporated by reference.

In embodiments, the weighting agent may be coated, for example, with dispersants such as oleic acid and polybasic fatty acids, alkylbenzene sulphonic acids, alkane sulphonic acids, linear alpha-olefin sulphonic acids, phospholipids such as lecithin, including salts thereof and including mixtures thereof. Synthetic polymers may also be used, such as HYPERMER™ OM-1 (Imperial Chemical Industries, PLC, London, United Kingdom) or polyacrylate esters, for example. Such polyacrylate esters may include polymers of stearyl methacrylate and/or butylacrylate. In another embodiment, the corresponding acids methacrylic acid and/or acrylic acid may be used. One skilled in the art would recognize that other acrylate or other unsaturated carboxylic acid monomers (or esters thereof) may be used to achieve substantially the same results as disclosed herein.

The quantity of the coated or uncoated weighting agent added, if any, may depend upon the desired density of the final composition. Weighting agents may be added to result in a density of up to about 22 pounds per gallon (ppg). In other embodiments, the weighting agent may be added to achieve a density of up to 20 ppg or up to 19.5 ppg.

EXAMPLES

The following examples will illustrate embodiments of electrically conductive wellbore fluids in accordance with the present disclosure, but are not meant to be limiting in any manner.

Example 1

In a series of experiments, assays conducted below illustrate the effects of various weighting agents on the conductivity of carbon nanomaterial-containing wellbore fluid formulations. Sample wellbore fluids were formulated using ESCAID™ 110 a base oil available from ExxonMobil (Houston, Tex.); GANEX V216, a dispersant available from ISP Co. Ltd. (Wayne, N.J.). Also included in the formulations was VG-PLUS™, an organic clay viscosifier; SUREMUL™, ONEMUL™, MEGAMUL™, and MUL-XT™ emulsifiers; ONETROL™, a fluid loss additive; M-I WATE™, 1012UF, and WARP™, micronized barites, all of which are available commercially from M-I SWACO (Houston, Tex.); and NTL-M, a multi-walled nanotube product commercially available from Nanotechnology Laboratories (Yadkinville, N.C.). The $d_{90}$ for the micronized barite particles is 0.5-6 μm for 1012 UF and MI-WATE™, and 0.7-7.5 μm for WARP™ as compared to 3-74 μm for standard API-grade barite.

TABLE 1

Sample formulations for Example 1.

| | | Sample | | |
| --- | --- | --- | --- | --- |
| | | 1 | 2 | 3 |
| | | Megamul | Megamul | Megamul |
| | | M-I Wate, | with EMI- | with EMI- |
| PRODUCT | density | ppb | 1012 UF, ppb | 2040, ppb |
| ESCAID 110, ppb | 0.8 | 155 | 158 | 154 |
| Ganex V216, ppb | 0.9 | 1.75 | 1.75 | 1.75 |
| VG-Plus, ppb | 1.7 | 4.6 | 4.6 | 4.6 |
| Lime, ppb | 2.3 | 3.2 | 3.2 | 3.2 |
| MEGAMUL, ppb | 0.9 | 6 | 6 | 6 |

TABLE 1-continued

Sample formulations for Example 1.

| | | Sample | | |
|---|---|---|---|---|
| PRODUCT | density | 1 Megamul M-I Wate, ppb | 2 Megamul with EMI-1012 UF, ppb | 3 Megamul with EMI-2040, ppb |
| MUL-XT, ppb | 0.94 | — | — | — |
| ONETROL, ppb | 1.1 | 1 | 1 | 1 |
| 25% CaCl2, ppb | 1.23 | 104 | 102 | 101 |
| WARP, ppb | 3.9 | — | — | 234 |
| 1012 UF, ppb | 4.25 | — | 228 | — |
| Barite - M-I Wate, ppb | 4.12 | 229 | — | — |
| NTL-M, ppb | 1.2 | 2.6 | 2.6 | 2.6 |

TABLE 2

Sample formulations for Example 1.

| | Sample | | |
|---|---|---|---|
| PRODUCT | 4 Mul-XT M-I Wate, ppb | 5 Mul-XT with EMI-1012 UF, ppb | 6 Mul-XT with EMI-2040, ppb |
| ESCAID 110, ppb | 156 | 158 | 154 |
| Ganex V216, ppb | 1.75 | 1.75 | 1.75 |
| VG-Plus, ppb | 4.6 | 4.6 | 4.6 |
| Lime, ppb | 3.2 | 3.2 | 3.2 |
| MEGAMUL, ppb | — | — | — |
| MUL-XT, ppb | 6 | 6 | 6 |
| ONETROL, ppb | 1 | 1 | 1 |
| 25% CaCl$_2$, ppb | 104 | 102 | 101 |
| WARP, ppb | — | — | 234 |
| 1012 UF, ppb | — | 228 | — |
| Barite - M-I Wate, ppb | 229 | — | — |
| NTL-M, ppb | 2.6 | 2.6 | 2.6 |

Sample formulations were combined and mixed using a Hamilton Beach mixer, followed by shearing the samples with a Silverson shear mixer at 6000 RPM for 5 min. The final sample compositions possessed an oil-to-water ratio (OWR) of 0.7. Rheological measurements were taken at 150° F. using a Fann 35 viscometer. Conductivity measurements were collected before and after aging 16 hours at 150° F. Results are shown on Table 3.

TABLE 3

Rheological measurements for Example 1.

| | | SAMPLE | | | | | |
|---|---|---|---|---|---|---|---|
| | UNITS | 1 | 2 | 3 | 4 | 5 | 6 |
| Electrical Stability (ES), RT/150 (aged) | V | 2/40 | 1/5 | 7/4 | 4/10 | 1/3 | 1/1 |
| Period Dynamic Aging | hours | 16 | 16 | 16 | 16 | 16 | 16 |
| Aging Temperature | ° F. | 150 | 350 | 350 | 150 | 350 | 350 |
| RHEOLOGY: | ° F. | 150 | 150 | 150 | 150 | 150 | 150 |
| 600 RPM | cP | 117 | 137 | 166 | 106 | 125 | 147 |
| 300 RPM | cP | 73 | 97 | 121 | 65 | 85 | 102 |
| 200 RPM | cP | 57 | 79 | 99 | 49 | 68 | 82 |
| 100 RPM | cP | 40 | 59 | 76 | 33 | 50 | 60 |
| 6 RPM | cP | 15 | 26 | 32 | 11 | 20 | 25 |
| 3 RPM | cP | 12 | 20 | 23 | 9 | 16 | 18 |
| GELS 10" | lbs/100 ft$^2$ | 13 | 20 | 19 | 9 | 13 | 17 |
| GELS 10' | lbs/100 ft$^2$ | 13 | 20 | 19 | 10 | 15 | 18 |
| PLASTIC VISC. | cP | 44 | 40 | 45 | 41 | 40 | 45 |
| YIELD POINT | lbs/100 ft$^2$ | 29 | 57 | 76 | 24 | 45 | 57 |
| Conductivity before aging (RT) | µS/cm | 304 | 201 | 132.5 | 902 | 407 | 1502 |
| Conductivity after aging (150° F.) | µS/cm | 0.31 | 162 | 303 | 11.13 | 154.6 | 250 |

Example 2

In another set of experiments, assays conducted below illustrate the effects of various emulsifiers on the conductivity of carbon nanomaterial-containing wellbore fluid formulations. Wellbore fluids were prepared using ESCAID 110 a base oil available from ExxonMobil (Houston, Tex.); GANEX™ V216, a dispersant available from ISP Co. Ltd. (Wayne, N.J.). Also included in the formulations was VG-PLUS™, an organic clay viscosifier; SUREMUL™, ONEMUL™, MEGAMUL™, and MUL-XT™ emulsifiers; ONETROL™, a fluid loss additive, M-I WATE™ a micronized barite, all of which are available commercially from M-I SWACO (Houston, Tex.); and NTL-M, a multi-walled nanotube product commercially available from Nanotechnology Laboratories (Yadkinville, N.C.). Sample formulations are shown in Tables 4 and 5 below.

TABLE 4

Wellbore fluid formulations for Example 2

| SAMPLE | density (ppg) | Suremul Control, ppb | Suremul 1% NTL-M, ppb | Onemul Control, ppb | Onemul 1% NTL-M, ppb |
|---|---|---|---|---|---|
| ESCAID 110 | 0.8 | 158 | 157 | 158 | 156.5 |
| GANEX V216 | 0.9 | 1.75 | 1.75 | 1.75 | 1.75 |
| NTL M-grade | 1.2 | — | 3.5 | — | 3.5 |
| VG-PLUS, g | 1.7 | 4.6 | 4.6 | 4.6 | 4.6 |
| lime, g | 2.3 | 3.2 | 3.2 | 3.2 | 3.2 |
| SUREMUL | 0.96 | 6 | 6 | — | — |
| ONEMUL | 0.94 | — | — | 6 | 6 |
| MUL-XT | 0.94 | — | — | — | — |
| MEGAMUL | 0.9 | — | — | — | — |
| 25% CaCl2 | 1.23 | 106 | 105 | 106 | 105 |
| barite | 4.2 | 225 | 225 | 225 | 225 |

TABLE 5

Wellbore fluid formulations for Example 2

| SAMPLE COMPOSITION | MUL-XT Control | MUL-XT 1% NTL-M | MEGAMUL Control | MEGAMUL 1% NTL-M |
|---|---|---|---|---|
| ESCAID 110, ppb | 158 | 156 | 158.5 | 157 |
| GANEX V216, ppb | 1.75 | 1.75 | 1.75 | 1.75 |

TABLE 5-continued

Wellbore fluid formulations for Example 2

| SAMPLE COMPOSITION | MUL-XT Control | MUL-XT 1% NTL-M | MEGAMUL Control | MEGAMUL 1% NTL-M |
|---|---|---|---|---|
| NTL M-grade, ppb | — | 3.5 | — | 3.5 |
| VG-PLUS, ppb | 4.6 | 4.6 | 4.6 | 4.6 |
| lime, ppb | 3.2 | 3.2 | 3.2 | 3.2 |
| SUREMUL, ppb | — | — | — | — |
| ONEMUL, ppb | — | — | — | — |
| MUL-XT, ppb | 6 | 6 | — | — |
| MEGAMUL, ppb | — | — | 6 | 6 |
| 25% CaCl2, ppb | 106 | 105 | 105 | 104 |
| barite, ppb | 225 | 227 | 227 | 225 |

Sample formulations were combined and mixed using a Hamilton Beach mixer, followed by shearing the samples with a Silverson shear mixer at 6000 RPM for 5 min. The final density of the samples was 12 ppg with an OWR of 0.7. Rheological measurements were taken at 150° F. using a Fann 35 viscometer. Conductivity measurements were collected before and after aging 16 hours at 150° F. Results are shown below on Tables 6 and 7.

TABLE 6

Rheological data for Example 2.

| Sample | | SUREMUL Control, ppb | SUREMUL 1% NTL-M, ppb | ONEMUL Control, ppb | ONEMUL 1% NTL-M, ppb |
|---|---|---|---|---|---|
| ES RT/150 (aged) | mls | 200/223 | 1/5 | 275/259 | 2/1 |
| PERIOD AGED | HOURS | 16 | 16 | 16 | 16 |
| TEMPERATURE | ° F. | 150 | 150 | 150 | 150 |
| DYNAMIC/STATIC | D/S | D | D | D | D |
| RHEOLOGY: | ° F. | 150 | 150 | 150 | 150 |
| 600 RPM | cP | 25 | 155 | 26 | 172 |
| 300 RPM | cP | 13 | 97 | 13 | 111 |
| 200 RPM | cP | 8 | 76 | 8 | 86 |
| 100 RPM | cP | 5 | 53 | 5 | 62 |
| 6 RPM | cP | 1 | 19 | 1 | 21 |
| 3 RPM | cP | 1 | 12 | 1 | 13 |
| GELS 10" | lbs/100 ft2 | 2 | 14 | 2 | 14 |
| GELS 10' | lbs/100 ft2 | 2 | 14 | 2 | 15 |
| PLASTIC VISC. | lbs/100 ft² | 12 | 58 | 13 | 61 |
| YIELD POINT | lbs/100 ft2 | 1 | 39 | 0 | 50 |
| Conductivity after aging (150 F.) | uS/cm | 0 | 184.4 | 0 | 503 |

TABLE 7

Rheological data for Example 2 continued.

| Sample | MUL-XT Control, ppb | MUL-XT 1% NTL-M, ppb | MEGAMUL Control, ppb | MEGAMUL 1% NTL-M, ppb |
|---|---|---|---|---|
| ES RT/150 (aged) | 206/266 | 0/1 | 144/259 | 1/2 |
| PERIOD AGED (hours) | 16 | 16 | 16 | 16 |
| TEMPERATURE | 150 | 150 | 150 | 150 |
| DYNAMIC/STATIC | D | D | D | D |
| Temperature, ° F. | 150 | 150 | 150 | 150 |
| 600 RPM | 19 | 213 | 30 | 204 |
| 300 RPM | 10 | 138 | 14 | 145 |
| 200 RPM | 6 | 109 | 9 | 120 |
| 100 RPM | 4 | 79 | 6 | 88 |
| 6 RPM | 1 | 21 | 2 | 25 |
| 3 RPM | 1 | 15 | 2 | 16 |
| GELS 10" | 1 | 15 | 3 | 16 |
| GELS 10' | 2 | 15 | 4 | 17 |
| PLASTIC VISC., lbs/100 ft² | 9 | 75 | 16 | 59 |
| YIELD POINT, lbs/100 ft² | 1 | 63 | -2 | 86 |
| Conductivity after aging (150° F.) | 0 | 2510 | 0 | 152.2 |

Example 3

In the following example, a series of experiments was conducted to illustrate the effect of fluid loss additives on the conductivity of wellbore fluids containing carbon nanomaterials. Sample wellbore fluids were formulated using ESCAID 110 a base oil available from ExxonMobil (Houston, Tex.); GANEX™ V216, a dispersant available from ISP Co. Ltd. (Wayne, N.J.). Also included in the formulations was NTL-M, a multi-walled nanotube product commercially available from Nanotechnology Laboratories (Yadkinville, N.C.); VG-PLUS™, an organic clay viscosifier; MEGAMUL™, an emulsifier; VERSATROL™, VERSATROL™, VERSALIG™, ECOTROL™ RD, ONETROL™, and NOVATECH™ F fluid loss additives; and BR PARATROL™ and M-I WATE™ micronized barites; all of which are available commercially from M-I SWACO (Houston, Tex.). Sample formulations are shown below in Tables 8 and 9.

TABLE 8

Sample formulations for Example 3.

| PRODUCT | density (ppg) | SAMPLE COMPOSITION | | | |
|---|---|---|---|---|---|
| | | 1 No FLA | 2 VERSATROL | 3 VERSALIG | 4 ECOTROL RD |
| ESCAID 110, ppb | 0.8 | 157 | 156.5 | 156.5 | 156 |
| GANEX V216, ppb | 0.9 | 1.75 | 1.75 | 1.75 | 1.75 |
| NTL M-grade, ppb | 1.2 | 3.5 | 3.5 | 3.5 | 3.5 |
| VG-PLUS, ppb | 1.7 | 4.6 | 4.6 | 4.6 | 4.6 |
| lime, ppb | 2.3 | 3.2 | 3.2 | 3.2 | 3.2 |
| MEGAMUL, ppb | 0.9 | 6 | 6 | 6 | 6 |
| VERSATROL, ppb | 1.13 | — | 1 | — | — |
| VERSALIG, ppb | 1.6 | — | — | 1 | — |
| ECOTROL RD, ppb | 1.1 | — | — | — | 1 |
| ONETROL, ppb | 1.1 | — | — | — | — |
| BR PARATROL, ppb | 1 | — | — | — | — |
| NOVATECH F, ppb | 1.01 | — | — | — | — |
| 25% CaCl2, ppb | 1.23 | 104 | 104 | 104 | 104 |
| barite, ppb | 4.2 | 225 | 225 | 225 | 225 |

TABLE 9

Sample formulations for Example 3 continued.

| PRODUCT | SAMPLE COMPOSITION | | |
|---|---|---|---|
| | 5 ONETROL | 6 EMI789 | 7 NOVATEC F |
| ESCAID 110, ppb | 156 | 156 | 156 |
| GANEX V216, ppb | 1.75 | 1.75 | 1.75 |
| NTL M-grade, ppb | 3.5 | 3.5 | 3.5 |
| VG-PLUS, ppb | 4.6 | 4.6 | 4.6 |
| lime, ppb | 3.2 | 3.2 | 3.2 |
| MEGAMUL, ppb | 6 | 6 | 6 |
| VERSATROL, ppb | — | — | — |
| VERSALIG, ppb | — | — | — |
| ECOTROL RD, ppb | — | — | — |
| ONETROL, ppb | 1 | — | — |
| BR PARATROL, ppb | — | 1 | — |
| NOVATECH F, ppb | — | — | 1 |
| 25% CaCl2, ppb | 104 | 104 | 104 |
| barite, ppb | 225 | 225 | 225 |

Sample formulations were combined and mixed using a Hamilton Beach mixer, followed by shearing the samples with a Silverson shear mixer at 6000 RPM for 5 min. The final density of the samples was 12 ppg with an OWR of 0.7. Rheological measurements were taken at 150° F. using a Fann 35 viscometer. Conductivity measurements were collected before and after aging 16 hours at 150° F. Results are shown on Table 10.

TABLE 10

Rheological properties and conductivity measurements for sample formulations in Example 3.

| Sample | 1 | 2 | 3 | 4 | 5 | 6 | 7 |
|---|---|---|---|---|---|---|---|
| ES; RT/150 (AGED) mls | 1/2 | 1/26 | 9/26 | 1/18 | 2/4 | 5/17 | 2/25 |
| PERIOD AGED (h) | 16 | 16 | 16 | 16 | 16 | 16 | 16 |
| TEMPERATURE (° F.) | 150 | 150 | 150 | 150 | 150 | 150 | 150 |
| DYNAMIC/STATIC | D | D | D | D | D | D | D |
| RHEOLOGY at 150 F. | 150 | 150 | 150 | 150 | 150 | 150 | 150 |
| 600 RPM, cP | 204 | 165 | 124 | 162 | 166 | 146 | 131 |
| 300 RPM, cP | 145 | 110 | 77 | 105 | 105 | 93 | 87 |
| 200 RPM, cP | 120 | 87 | 59 | 81 | 83 | 73 | 68 |
| 100 RPM, cP | 88 | 61 | 40 | 56 | 58 | 50 | 48 |
| 6 RPM, cP | 25 | 21 | 15 | 20 | 18 | 19 | 19 |
| 3 RPM, cP | 16 | 14 | 13 | 15 | 13 | 16 | 15 |
| GELS 10", lbs/100 ft$^2$ | 16 | 14 | 14 | 16 | 12 | 16 | 16 |
| GELS 10', lbs/100 ft$^2$ | 17 | 13 | 16 | 15 | 13 | 18 | 16 |
| PLASTIC VISC. (cP) | 59 | 55 | 47 | 57 | 61 | 53 | 44 |
| YIELD POINT (lbs/100 ft$^2$) | 86 | 55 | 30 | 48 | 44 | 40 | 43 |
| Conductivity before aging (μS/cm), RT | 1598 | 502 | 6.86 | 316 | 805 | 320 | 300 |
| Conductivity after aging (μS/cm), 150° F. | 152.2 | 0.98 | 0.05 | 1.83 | 146.3 | 1.64 | 0.44 |
| HTHP Filtration, mL, 250° F. | 7.6 | 5.2 | 5.6 | 4.8 | 6.6 | 6 | 5.8 |
| Conductivity of filter cake (μS/cm) | | 0.11 | | | 5.57 | | |

Example 4

In the following example, a series of experiments was conducted on carbon nanomaterial-containing wellbore fluids formulated with diesel as a base fluid. Samples wellbore fluids were formulated using diesel a base oil; GANEX™ V216, a dispersant available from ISP Co. Ltd. (Wayne, N.J.). Also included in the formulations was VG-PLUS™, an organic clay viscosifier; MEGAMUL™ and MUL-XT™ emulsifiers; ONETROL™, a fluid loss additive, both of which are available commercially from M-I SWACO (Houston, Tex.); and NTL-M, a multi-walled nanotube product commercially available from Nanotechnology Laboratories (Yadkinville, N.C.). Sample formulations are shown below in Table 11.

TABLE 11

Sample formulations for Example 4.

| PRODUCT | UNITS | density, ppb | 1 Control | 2 API Barite | 3 1012 UF | 4 0.5% NTL-M, API Barite | 5 0.75% NTL-M, API Barite | 6 Mul-XT with diesel |
|---|---|---|---|---|---|---|---|---|
| diesel | ppb | 0.84 | 169 | 167 | 167 | 167 | 167 | 166 |
| GANEX V216 | ppb | 0.9 | 1.75 | 1.75 | 1.75 | 1.75 | 1.75 | 1.75 |
| VG-PLUS | ppb | 1.7 | 4.6 | 4.6 | 4.6 | 4.6 | 4.6 | 4.6 |
| lime | ppb | 2.3 | 3.2 | 3.2 | 3.2 | 3.2 | 3.2 | 3.2 |
| MEGAMUL | ppb | 0.9 | 6 | 6 | 6 | 6 | 6 | — |
| MUL-XT | ppb | 0.94 | — | — | — | — | — | 6 |
| ONETROL | ppb | 1.1 | — | — | — | — | — | 1 |
| 25% CaCl$_2$ | ppb | 1.23 | 105 | 103 | 103 | 104 | 103 | 104 |
| API barite | ppb | 4.2 | 216 | 220 | — | 220 | 220 | 221 |
| 1012 UF barite | ppb | 4.2 | — | — | 220 | — | — | — |
| NTL-M MWNT | ppb | 1.2 | — | 3.5 | 3.5 | 1.75 | 2.6 | 2.6 |

Sample formulations were combined and mixed using a Hamilton Beach mixer, followed by shearing the samples with a Silverson shear mixer at 6000 RPM for 5 min. The final density of the samples was 12 ppg with an OWR of 0.7. Rheological measurements were taken at 150° F. using a Fann 35 viscometer. Conductivity measurements were collected before and after aging 16 hours at 150° F. Results are shown on Table 12.

TABLE 12

Rheological data for sample formulations in Example 4.

| Sample | 1 | 2 | 3 | 4 | 5 | 6 |
|---|---|---|---|---|---|---|
| Measurement temperature, °F. | 150 | 150 | 150 | 150 | 150 | 150 |
| 600 RPM, cP | 36 | 270 | >300 | 107 | 179 | 174 |
| 300 RPM, cP | 18 | 174 | 246 | 63 | 112 | 106 |
| 200 RPM, cP | 13 | 135 | 196 | 47 | 84 | 82 |
| 100 RPM, cP | 8 | 94 | 149 | 32 | 58 | 55 |
| 6 RPM, cP | 2 | 30 | 41 | 12 | 20 | 19 |
| 3 RPM, cP | 2 | 19 | 29 | 10 | 15 | 16 |
| GELS 10", lbs/100 ft$^2$ | 3 | 18 | 23 | 11 | 16 | 16 |
| GELS 10', lbs/100 ft$^2$ | 4 | 18 | 23 | 13 | 14 | 16 |
| PLASTIC VISCOSITY, cP | 18 | 96 | 54 | 44 | 67 | 68 |
| YIELD POINT, lbs/100 ft$^2$ | 0 | 78 | 192 | 19 | 45 | 38 |
| Conductivity before aging (μS/cm), RT | — | 4980 | 6250 | 35.7 | 1595 | 921 |
| Conductivity after aging, (μS/cm), 150° F. | — | 3880 | 4700 | 118.5 | 519 | 196 |

Example 5

In the following example, a series of experiments was conducted to study the effect of adding a mixture of a carbon nanomaterial and a particulate carbon to an oil-based wellbore fluid. Sample wellbore fluids were formulated using ESCAID™ 110 a base oil available from ExxonMobil (Houston, Tex.); GANEX V216, a dispersant available from ISP Co. Ltd. (Wayne, N.J.). Also included in the formulations was VG-PLUS™, an organic clay viscosifier; SUREMUL™, ONEMUL™, MEGAMUL™, and MUL-XT™ emulsifiers; ONETROL™, a fluid loss additive, M-I WATE™ a micronized barite, all of which are available commercially from M-I SWACO (Houston, Tex.); and NTL-M, a multi-walled nanotube product commercially available from Nanotechnology Laboratories (Yadkinville, N.C.). Particulate carbons used in the following formulations were selected from ENSACO™ conductive carbon black from Timcal Graphite and Carbon (Westlake, Ohio) and ASBURY 4827, a synthetic graphite available from Asbury Carbons (Asbury, N.J.). The d/g ratio of the particulate carbons, as calculated by Raman spectroscopy, was 0.86 for ENSACO™ CCB and 0.35 for synthetic graphite 4827. Sample formulations are shown below in Table 13.

TABLE 13

Sample formulations for Example 5.

| | density | 1 | 2 | 3 | 4 |
|---|---|---|---|---|---|
| ESCAID 110, ppb | 0.8 | 158 | 156 | 158 | 156 |
| GANEX V216, ppb | 0.9 | 1.75 | 1.75 | 1.75 | 1.75 |
| VG PLUS, ppb | 1.7 | 4.6 | 4.6 | 4.6 | 4.6 |
| lime, ppb | 2.3 | 3.2 | 3.2 | 3.2 | 3.2 |
| MEGAMUL, ppb | 0.9 | 6 | 6 | 6 | 6 |

TABLE 13-continued

Sample formulations for Example 5.

| | density | Sample 1 | Sample 2 | Sample 3 | Sample 4 |
|---|---|---|---|---|---|
| 25% CaCl2, ppb | 1.23 | 106 | 105 | 106 | 105 |
| barite, ppb | 4.2 | 225 | 227 | 225 | 227 |
| ENSACO CCB, ppb | 1.8 | 3.5 | 3.5 | — | — |
| 4827 synthetic graphite, ppb | 1.8 | — | — | 3.5 | 3.5 |
| NTL-M, ppb | 1.2 | — | 3.5 | — | 3.5 |

Sample formulations were combined and mixed using a Hamilton Beach mixer, followed by shearing the samples with a Silverson shear mixer at 6000 RPM for 5 min. The final density of the samples was 12 ppg with an OWR of 0.7. Rheological measurements were taken at 150° F. using a Fann 35 viscometer. Conductivity measurements were collected before and after aging 16 hours at 150° F. Results are shown on Table 14.

TABLE 14

Rheological and conductivity data for sample formulations in Example 5.

| | | Sample 1 | Sample 2 | Sample 3 | Sample 4 |
|---|---|---|---|---|---|
| Measurement Temperature | ° F. | 150 | 150 | 150 | 150 |
| 600 RPM | cP | 29 | 230 | 24 | 182 |
| 300 RPM | cP | 14 | 150 | 11 | 119 |
| 200 RPM | cP | 9 | 117 | 7 | 91 |
| 100 RPM | cP | 6 | 82 | 4 | 63 |
| 6 RPM | cP | 2 | 28 | 1 | 21 |
| 3 RPM | cP | 1 | 19 | 1 | 15 |
| GELS 10" | lbs/100 ft2 | 2 | 18 | 1 | 15 |
| GELS 10' | lbs/100 ft2 | 3 | 18 | 2 | 14 |
| PLASTIC VISC. | cP | 15 | 80 | 13 | 63 |
| YIELD POINT | lbs/100 ft2 | −1 | 70 | −2 | 56 |
| Conductivity before aging (RT) | μS/cm | 0.01 | 609 | 0 | 83.5 |
| Conductivity after aging (150° F.) | μS/cm | 0.02 | 49.8 | 0.03 | 8.28 |
| ES after aging (150° F.) | | 175 | 8 | 222 | 11 |

Advantageously, embodiments disclosed herein provide for improved levels of electrical conductivity during logging operations within a wellbore. In some embodiments, improved levels of conductivity may be achieved at advantageously low concentrations of the one or more carbon nanomaterials of the present disclosure as compared to prior carbon nanomaterials.

Further advantages may include obtaining electrically conductive, oil-based wellbore fluids that maintain performance advantages expected from known oil-based (or synthetic organic liquid-based) wellbore fluids including enhanced lubricity, reduced differential sticking of drill pipe, and good stability at high temperatures, in addition to improved conductivity. Fluid additives that require large volume fractions may be impractical due to the effect on the other fluid properties, however the carbon nanomaterials and particulate carbons of the present disclosure may enable conductance with minimal effect on other fluid properties. Thus, whereas previous fluids could not achieve both the benefits attributed to oil based fluids and also allow for resistivity measurements, embodiments of the present disclosure may allow for the modification of any oil based fluid to become electrically conductive.

The Applicant has also discovered that when combined in a single fluid formulation, a combination of carbon nanomaterials and particulate carbon may enhance the conductivity of wellbore fluids. Conductive carbon black and carbon nanotubes may act synergistically, enhancing conductivity to a greater degree than the either material added alone in an amount relative to the mixture.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. Moreover, embodiments disclosed herein may be practiced in the absence of any element which is not specifically disclosed.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method comprising:
    placing a logging medium into a subterranean well, wherein the logging medium comprises:
      a non-aqueous fluid;
      one or more multi-walled carbon nanotubes having, a d/g ratio as determined by Raman spectroscopy of 0.01 to 0.6 and being present at a concentration from about 0.0001 wt % to about 10 wt % of the logging medium so as to permit the electrical logging of the subterranean well; and
      one or more particulate carbons selected from a group consisting of:
        synthetic graphite; and
        carbon black,
        wherein a weight/weight ratio of the one or more multi-walled carbon nanotubes to the one or more particulate carbons is from 0.01 to 30; and
    acquiring an electrical log from the subterranean well.

2. The method of claim 1, further comprising:
    collecting logging data; and
    refining drill location based on the collected logging data.

3. The method of claim 1, wherein the concentration of the one or more multi-walled carbon nanotubes is 3 wt % or less of the logging medium and the weight/weight ratio is from 0.2 to 10.

4. The method of claim 1, wherein the one or more multi-walled carbon nanotubes have at least one dimensional measurement within the range of 50 μm to 5 cm.

5. A method for electrical logging of a subsection of a subterranean well comprising:

emplacing a non-aqueous drilling fluid into a wellbore;
identifying a subsection of the wellbore for imaging;
introducing a non-aqueous fluid to the subsection of the wellbore, the non-aqueous fluid comprising:
one or more multi-walled carbon nanotubes present at a concentration ranging from about 0.0001 wt % to about 10 wt % of the non-aqueous fluid; and
one or more particulate carbons selected from the group consisting of:
synthetic graphite; and
carbon black,
wherein the one or more particulate carbons have an average particle size within the range of 0.25 μm and 50 μm and a weight/weight ratio of the one or more multi-walled carbon nanotubes to the one or more particulate carbons is from 0.01 to 30; and
acquiring an electrical log of the subsection of the wellbore.

6. The method of claim 5, wherein the concentration of the one or more multi-walled carbon nanotubes is 3 wt % or less of the of the non-aqueous fluid and the weight/weight ratio is from 0.3 to 5.

7. The method of claim 5, wherein the one or more multi-walled carbon nanotubes have at least one dimensional measurement within the range of 50 μm to 5 cm.

8. The method of claim 5, wherein the one or more multi-walled carbon nanotubes have a d/g ratio as determined by Raman spectroscopy of 0.01 to 0.6.

9. The method of claim 5, wherein the average particle diameter of the one or more particulate carbons is less than the average particle diameter of the one or more multi-walled carbon nanotubes.

10. The method of claim 5, wherein an overall particle shape of the one or more particulates carbons is spherical.

11. A method for electrical logging of a subsection of a subterranean well comprising:
emplacing a non-aqueous drilling fluid into a wellbore;
introducing a non-aqueous fluid to the subsection of the wellbore, wherein the non-aqueous fluid comprises:
one or more multi-walled carbon nanotubes present at a concentration ranging from about 0.0001 wt % to about 10 wt % of the non-aqueous fluid; and
one or more particulate carbons selected from the group consisting of:
synthetic graphite; and
carbon black,
wherein the one or more particulate carbons have an average particle size within the range of 0.25 μm and 50 μm and a weight/weight ratio of the one or more multi-walled carbon nanotubes to the one or more particulate carbons is from 0.01 to 30; and
acquiring an electrical log of the subsection of the wellbore.

12. A method comprising:
placing a logging medium into a subterranean well, wherein the logging medium comprises:
a non-aqueous fluid;
one or more multi-walled carbon nanotubes having a d/g ratio as determined by Raman spectroscopy of 0.01 to 0.6 and present at a concentration from about 0.0001 wt % to about 10 wt % of the logging medium so as to permit the electrical logging of the subterranean well; and
one or more particulate carbons are selected from a group consisting of:
synthetic graphite; and
carbon black,
wherein a weight/weight ratio of the one or more multi-walled carbon nanotubes to the one or more particulate carbons is from 0.01 to 30; and
acquiring an electrical log from the subterranean well, wherein the electrical log is used to determine a relative resistivity of the subterranean well.

13. The method of claim 12, further comprising:
collecting logging data; and
refining drill location based on the collected logging data.

14. The method of claim 12, wherein the concentration of the one or more multi-walled carbon nanotubes is 3 wt % or less of the logging medium and the weight/weight ratio is from 0.1 to 20.

15. The method of claim 12, wherein the one or more multi-walled carbon nanotubes have at least one dimensional measurement within the range of 50 μm to 5 cm.

* * * * *